Figure 1:
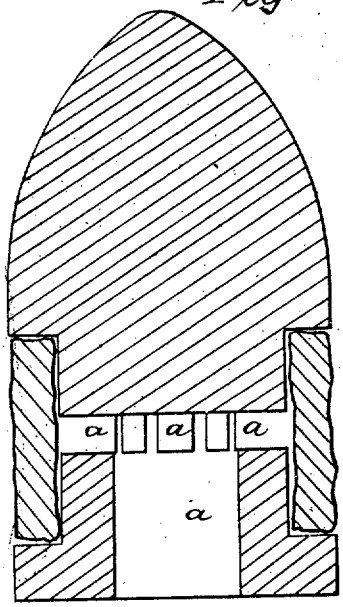

2 Sheets—Sheet 1.

C. T. JAMES.

Projectile.

No. 1,098.

Reissued Dec. 11, 1860.

N. PETERS, Photo-Lithographer, Washington, D. C.

2 Sheets—Sheet 2.

C. T. JAMES.

Projectile.

No. 1,098.

Reissued Dec. 11, 1860.

Fig. 4. A. a

N. PETERS. Photo-Lithographer. Washington, D. C.

UNITED STATES PATENT OFFICE.

CHAS. T. JAMES, OF PROVIDENCE, RHODE ISLAND.

IMPROVEMENT IN PROJECTILES.

Specification forming part of Letters Patent No. 14,315, dated February 26, 1856; Reissue No. 1,098, dated December 11, 1860.

*To all whom it may concern:*

Be it known that I, CHARLES T. JAMES, of Providence, Rhode Island, have invented a new and useful Improvement in Projectiles, which has not been known or used before my invention thereof, a full and exact description whereof is herein contained, reference being had to the accompanying drawings, forming a part of this specification.

My invention relates to projectiles to be used in rifled cannon for the purpose of more effectually imparting to the projectile, when fired, the rotary motion on its axis which is necessary for accuracy of firing and of shutting off the windage, so as to increase the force of the discharge.

Heretofore the general idea which has been used in projectiles for rifled cannon is that of expanding the material which composes the projectile by upsetting or distending it by the explosive power of the powder, the inertia of the front end of the ball resisting the tendency to move until the distending effect had been produced. In small-arms this is now the usual method employed with balls of soft material entirely, and in cannons it has been tried by constructing the ball or shell of two metals—the one rigid, as cast-iron, composing the head and principal part of the shot, and the other soft, as lead, composing the base, where the expansion is to take place. All those plans, however, proceed upon the idea of enlarging or altering the shape of the shot itself, and all are therefore defective.

My invention consists in combining with the projectile a surrounding expansible packing, the inside of which communicates with the chamber of the gun, so that the force of the discharge shall act against the inside thereof and expand it into contact with the bore of the gun and into the grooves thereof, and thereby stop windage and cause the projectile to be rotated as it is being discharged. By means of this principle of construction I can make the projectile of cast-iron, and of any required strength, so that it is not liable to be blown to pieces, as projectiles are which are made of different metals, or in which the metal of the projectile is itself expanded, while at the same time the packing can be held against the bore of the gun with a pressure commensurate with the projectile-power, thus shutting off all windage and perfectly controlling the rotation of the shot. In projectiles which depend upon the expansion of the metal itself at the instant of discharge, and in which the pressure is not maintained during the discharge, the loss by windage is very great; but in this arrangement the windage is practically all controlled, because the very pressure which tends to drive out the projectile is employed to close the apertures of its escape, the effect of which is an immensely-increased force, as well as great accuracy.

In the accompanying drawings, I have exhibited various methods of construction by which my new principle of operation can be carried out with advantage, not intending, however, to confine myself to those, but only showing them as the best which have occurred to me in my experience. I prefer to cover the packing with canvas or other textile fibrous material, and to grease or wet it, as may be best for the particular material used. Vulcanized india-rubber will be found a good material for the surface of the packing.

Figure 3:
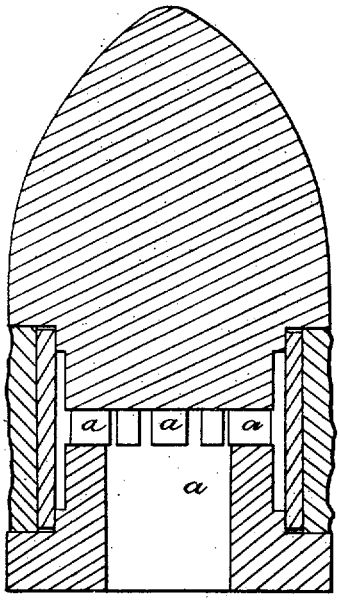
Figure 4:
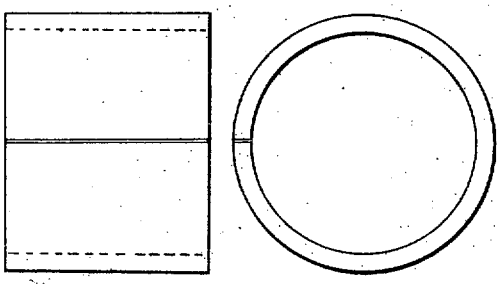
Figure 2:
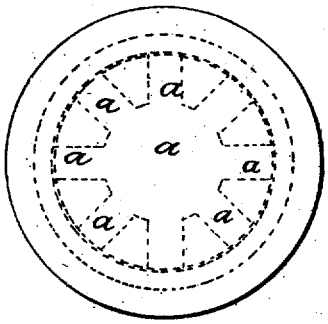
Figure 2:
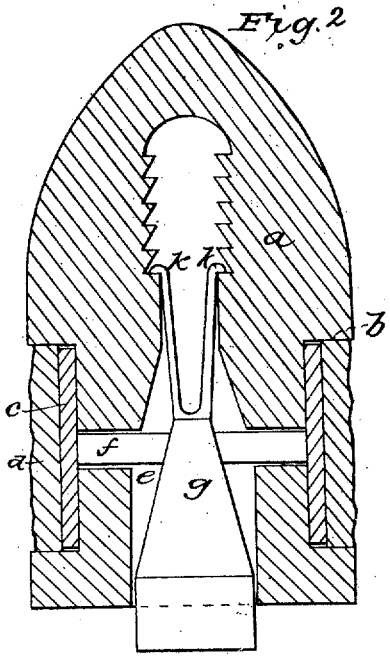
Figure 3:
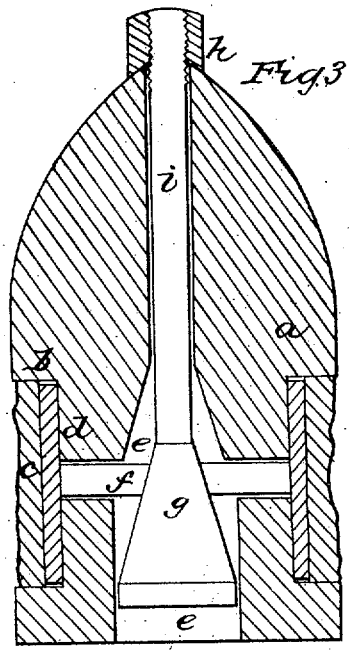
Figure 1:
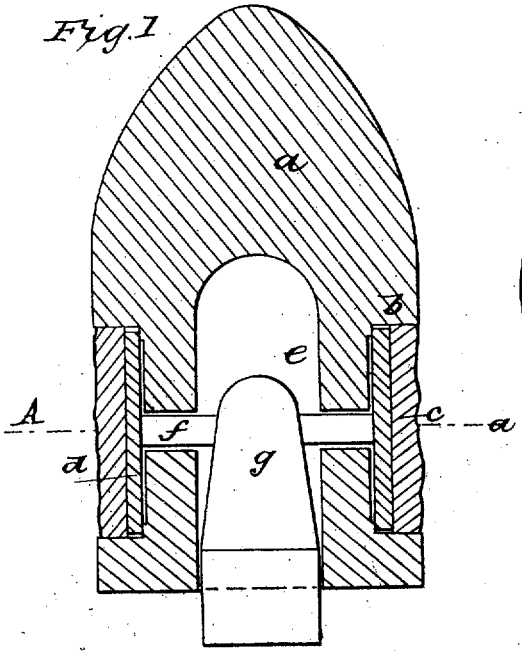
Figure 1:
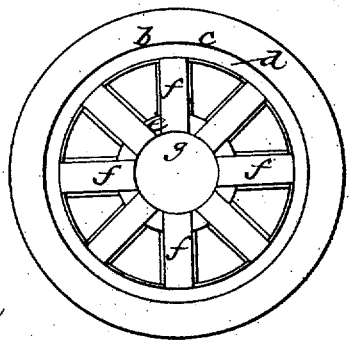

In Plate 1, Fig. 1, represents the simplest form of construction, Fig. 2 being a section through the projectile at *a a a*, in which these letters indicate the apertures between the chamber of the gun and the packing. The packing in this case is entirely of textile or fibrous material wound tightly around the projectile. If made of india-rubber, it might be vulcanized upon the shot. Fig. 3 represents the same projectile with a flexible metallic ring between the body of the projectile and the fibrous surface, so as to give greater stiffness to the packing-ring, Fig. 4 being a section of the metallic ring.

In Plate 2, Figs. 1, 2, and 3 are longitudinal sections through the center of projectiles shaped like the one illustrated in Plate 1, and provided with a surrounding packing; but in this plate is shown a combination of the well-known mechanical action of the wedge, with an expansible packing surrounding the projectile, so that by the application of the required force the packing will be wedged outward, and expanded against the bore of the gun and into the rifled grooves thereof, if the gun be rifled.

*a* is the shot, in the cylindrical rear portion of which is formed a broad groove, *b*, extending all around, to receive the packing-ring *c*, which I prefer to make of a cut hoop of flexible metal *d*, sprung into the said grooves, and so connected therewith by a clip or piece or other device as to prevent the packing from turning, and wrapped on the outside with hemp-packing, either formed of spun yarn formed into braid and greased, or of woven bands of canvas, or otherwise formed. From the bottom of the groove *b* are radial mortises, like those shown in Plate 1, and communicating with a central bore, *e*, made in the projectile from the rear end thereof. In these mortises are fitted radial slugs F, adapted to slide therein, so that their outer ends may rest against the inner periphery of the packing-ring, while their inner ends rest against the conical surface of a plug, *g*, the cylindrical portion of which is fitted to slide in the cylindrical bore *e* of the projectile.

From the foregoing it will follow that, after the projectile is inserted in the bore of the gun, any force applied to the conical plug to force it into the projectile, its conical surface acting on the inner end of all the radial plugs, will force them outward against the inner periphery of the packing-ring, and thereby expand it, and force its outer periphery into contact with the bore of the gun, to shut off the windage, and into the grooves of the gun, if it be rifled, so as to give the projectile a rotary motion when fired. This wedging action, to force out the packing, can be produced either by the force of the expanding gases, due to the explosion of the charge acting against the rear face of the conical plug, and forcing it forward into the projectile, or by the act of ramming down the projectile against the charge of the gun, or by turning a nut, *h*, on the head of the projectile, which nut is tapped into the end of a rod, *i*, projecting from the head of the conical plug, and passing through the projectile, which in such instance must be bored entirely through, as represented in Fig. 3, Plate 2. In the latter case the rammer should be formed with a key to turn the nut, and in the modification shown at Fig. 2, Plate 2, there may be spring-catches *k* on the forward end of the conical plug to catch onto ratchets in the bore of the projectile, to hold it as it is forced in by ramming.

The metallic ring should be secured to the surface of the shot by pins or projections to prevent its turning.

Having thus described the principle or character of my said invention and the mode of application which I deem the best, with such modifications as I contemplate making, I do not wish to be understood as limiting my claim of invention to such mode or modes of application, as other modes of application involving the same principle or character may be devised.

What I claim as my invention, and desire to secure by Letters Patent, is—

The employment of an expansible packing surrounding the projectile, and so combined therewith, substantially as described, that the force of the discharge acting on the inside of such packing shall force it outward against the bore of the gun, and into the grooves thereof, if the gun be rifled, substantially as set forth.

CHAS. T. JAMES.

Witnesses:

G. H. PRUFIELD,

WM. SMALLWOOD.